United States Patent
Seldenrust et al.

(10) Patent No.: US 12,044,357 B1
(45) Date of Patent: *Jul. 23, 2024

(54) MOBILE ELECTRIC POWER GENERATION TRAILER SYSTEM AND METHODS

(71) Applicant: Relevant Power Solutions, LLC, Houston, TX (US)

(72) Inventors: Jeffrey R Seldenrust, Conroe, TX (US); Harley M Ross, Pearland, TX (US)

(73) Assignee: Relevant Power Solutions, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/179,343

(22) Filed: Mar. 6, 2023

Related U.S. Application Data

(63) Continuation of application No. 17/452,293, filed on Oct. 26, 2021, now Pat. No. 11,598,477.

(60) Provisional application No. 63/105,739, filed on Oct. 26, 2020.

(51) Int. Cl.
| | | |
|---|---|---|
| *F01D 15/10* | (2006.01) | |
| *F01D 25/28* | (2006.01) | |
| *F16M 3/00* | (2006.01) | |
| *F02C 7/20* | (2006.01) | |
| *F02C 7/32* | (2006.01) | |

(52) U.S. Cl.
CPC .............. *F16M 3/00* (2013.01); *F01D 15/10* (2013.01); *F01D 25/28* (2013.01); *F02C 7/20* (2013.01); *F02C 7/32* (2013.01); *F05B 2240/941* (2013.01); *F05D 2220/76* (2013.01); *F05D 2230/68* (2013.01); *F05D 2240/90* (2013.01)

(58) Field of Classification Search
CPC . F16M 3/00; F01D 15/10; F01D 25/28; F02C 7/20; F02C 7/32; F05B 2240/941; F05D 2220/76; F05D 2230/68; F05D 2240/90
See application file for complete search history.

(56) References Cited

U.S. PATENT DOCUMENTS

| | | |
|---|---|---|
| 6,334,746 B1 | 1/2002 | Nguyen et al. |
| 6,765,304 B2 | 7/2004 | Baten et al. |
| 8,587,136 B2 | 11/2013 | Williams |
| 9,534,473 B2 | 1/2017 | Morris et al. |
| 9,802,584 B2 | 10/2017 | Sethi |
| 10,030,579 B2 | 7/2018 | Austin et al. |
| 10,184,397 B2 | 1/2019 | Austin et al. |
| 10,337,402 B2 | 7/2019 | Austin et al. |

(Continued)

OTHER PUBLICATIONS

Notice of Allowance, issued Jun. 12, 2023, 7 pages, in U.S. Appl. No. 17/821,366.

*Primary Examiner* — Craig Kim
*Assistant Examiner* — Rene D Ford
(74) *Attorney, Agent, or Firm* — AVEK IP, LLC

(57) ABSTRACT

A method of assembling a mobile electric power generation system includes using a generator trailer having an electric generator, a gas turbine trailer having a gas turbine, an exhaust trailer configured to exhaust air, and an air filter and ventilation trailer having an anti-icing system. The generator trailer and the gas turbine trailer is positioned at a work site such that the generator trailer and the gas turbine trailer are in an end-to-end configuration. The gas turbine trailer is operably coupled to the generator trailer.

18 Claims, 16 Drawing Sheets

(56) References Cited

U.S. PATENT DOCUMENTS

| | | | |
|---|---|---|---|
| 10,371,012 B2 | 8/2019 | Davis et al. | |
| 10,374,485 B2 | 8/2019 | Morris et al. | |
| 11,598,477 B1 | 3/2023 | Seldenrust et al. | |
| 2014/0096974 A1 | 4/2014 | Coli et al. | |
| 2015/0033698 A1* | 2/2015 | Cuevas | F01D 25/002 |
| | | | 60/39.093 |
| 2016/0075387 A1* | 3/2016 | Fong | B60D 1/64 |
| | | | 403/14 |
| 2017/0321600 A1 | 11/2017 | Moniz et al. | |
| 2018/0041093 A1 | 2/2018 | Miranda | |
| 2019/0204021 A1* | 7/2019 | Morris | F28F 27/00 |
| 2020/0347725 A1 | 11/2020 | Morris et al. | |
| 2020/0408071 A1* | 12/2020 | Li | F01D 25/30 |
| 2020/0408147 A1* | 12/2020 | Zhang | F02C 6/00 |
| 2021/0025324 A1 | 1/2021 | Morris et al. | |

* cited by examiner

MOBILE ELECTRIC POWER GENERATION TRAILER SYSTEM AND METHODS

CROSS-REFERENCE TO RELATED APPLICATIONS

This application is a continuation of U.S. application Ser. No. 17/452,293, filed Oct. 26, 2021, which claims priority to U.S. Provisional Application No. 63/105,739 filed Oct. 26, 2020, the disclosure of which is hereby incorporated by reference in its entirety.

FIELD OF DISCLOSURE

The disclosure relates generally to the field of mobile electric power generation. More specifically, the disclosure relates to mobile electric power generator trailer systems and methods of making and using same.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In some aspects, the techniques described herein relate to a method of assembling a mobile electric power generation system, including: using a generator trailer having an electric generator, a gas turbine trailer having a gas turbine, an exhaust trailer configured to exhaust air, and an air filter and ventilation trailer having an anti-icing system; positioning the generator trailer at a work site; arranging the gas turbine trailer at the work site such that the generator trailer and the gas turbine trailer are in an end-to-end configuration; operably coupling the gas turbine trailer to the generator trailer; positioning the exhaust trailer at a first side of the gas turbine trailer; positioning the air filter and ventilation trailer at a second side of the gas turbine trailer, the second side opposing the first side; and operably coupling each of the exhaust trailer and the air filter and ventilation trailer to the gas turbine trailer.

In some aspects, the techniques described herein relate to a method, wherein the air filter and ventilation trailer includes a combustion air silencer, a ventilation air supply, and a ventilation air discharge.

In some aspects, the techniques described herein relate to a method, further including coupling each of the combustion air silencer, the ventilation air supply, and the ventilation air discharge respectively to a first port, a second port, and a third port of the gas turbine trailer.

In some aspects, the techniques described herein relate to a method, wherein: (a) positioning the generator trailer at the work site includes backing the generator trailer into the work site using a vehicle; and (b) arranging the gas turbine trailer at the work site includes backing the gas turbine trailer into the work site such that the gas turbine trailer and the generator trailer are in an end-to-end configuration.

In some aspects, the techniques described herein relate to a method, further including associating a detachable gooseneck with the generator trailer.

In some aspects, the techniques described herein relate to a method, further including detaching the gooseneck from the generator trailer prior to positioning the gas turbine trailer in the end-to-end configuration with the generator trailer.

In some aspects, the techniques described herein relate to a method, further including detaching a gooseneck from the generator trailer prior to positioning the gas turbine trailer in the end-to-end configuration with the generator trailer.

In some aspects, the techniques described herein relate to a method, further including using a retractable exhaust outlet on the exhaust trailer, the retractable exhaust outlet configured to retract into a plenum for transport.

In some aspects, the techniques described herein relate to a method, further including using a hinged exhaust inlet on the exhaust trailer.

In some aspects, the techniques described herein relate to a method, wherein the hinged exhaust inlet is in a first position during a transport mode and in a second position during an operational mode.

In some aspects, the techniques described herein relate to a method, further including configuring the air filter and ventilation trailer to warm intake air by recirculating air from the gas turbine trailer through the anti-icing system.

In some aspects, the techniques described herein relate to a method, wherein the generator trailer includes a dolly.

In some aspects, the techniques described herein relate to a method of assembling a mobile electric power generation system, including: using a generator trailer having an electric generator, a gas turbine trailer having a gas turbine, an exhaust trailer having an exhaust device, and an air filter and ventilation trailer that includes a combustion air silencer, a ventilation air supply, a ventilation air discharge, and an anti-icing system; positioning each of the generator trailer, the gas turbine trailer, the exhaust trailer, and the air filter and ventilation trailer at a job site such that the generator trailer and the gas turbine trailer are in an end-to-end configuration and the air filter and ventilation trailer and the exhaust trailer are on opposing sides of the gas turbine trailer; operably coupling each of the generator trailer, the exhaust trailer, and the air filter and ventilation trailer to the gas turbine trailer in an operational mode for power generation; and decoupling the generator trailer, the air filter and ventilation trailer, and the exhaust trailer from the gas turbine trailer in a transport mode for transport; wherein, operably coupling the air filter and ventilation trailer to the gas turbine trailer in the operational mode includes coupling each of the combustion air silencer, the ventilation air supply, and the ventilation air discharge respectively to a first port, a second port, and a third port of the gas turbine trailer.

In some aspects, the techniques described herein relate to a method, further including aligning the gas turbine trailer and the generator trailer using alignment structures located at an end of each of the generator trailer and the gas turbine trailer.

In some aspects, the techniques described herein relate to a method, wherein each of the generator trailer and the gas turbine trailer further include a monocoque truss frame.

In some aspects, the techniques described herein relate to a method, further including detaching a detachable gooseneck from the generator trailer prior to operably coupling the gas turbine trailer to the generator trailer.

In some aspects, the techniques described herein relate to a method of assembling a mobile electric power generation system, including: using a generator trailer having an electric generator, a gas turbine trailer having a gas turbine, an exhaust trailer having an exhaust device, and an air filter and ventilation trailer having a ventilation air supply, a ventilation air exhaust, and a silencer; and generating power with the mobile electric power generation system after each of the ventilation air supply, the ventilation air exhaust, and the silencer are coupled to the gas turbine trailer.

In some aspects, the techniques described herein relate to a method, wherein the exhaust trailer includes a hinged exhaust inlet and a retractable exhaust outlet, the retractable exhaust outlet configured to retract into a plenum for transport.

In some aspects, the techniques described herein relate to a method, further including configuring the air filter and ventilation trailer to warm intake air by recirculating air from the gas turbine trailer through an anti-icing system.

In some aspects, the techniques described herein relate to a method, further including detaching a detachable gooseneck from the generator trailer prior to operably coupling the gas turbine trailer to the generator trailer.

DETAILED DESCRIPTION

Figure 1:
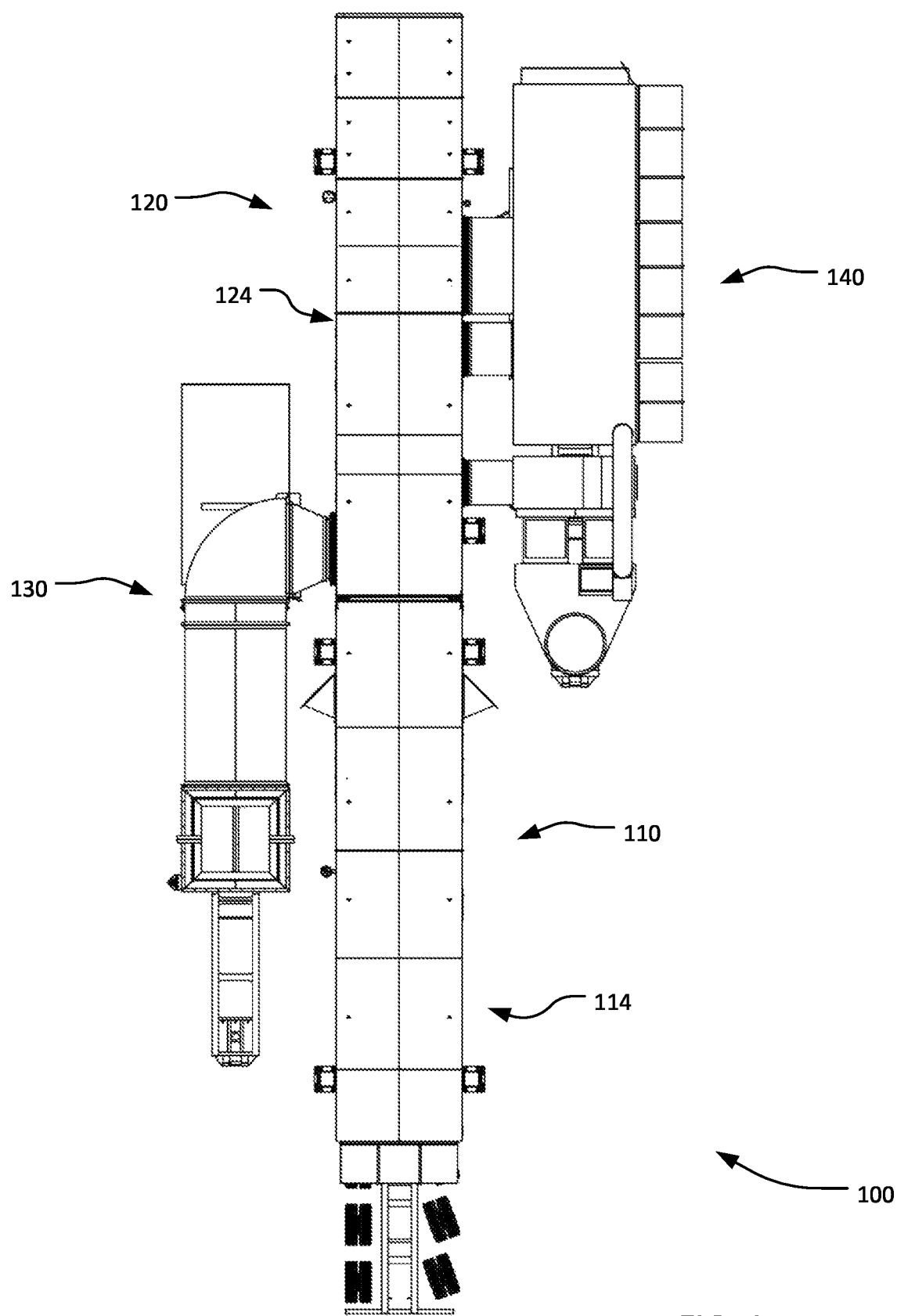
FIG. 1 is a top view of a mobile electric power generation trailer system, according to an embodiment of the disclosure.

Electric power generation systems (e.g., power generation systems for use in the oil and gas industry, the industrial power generation industry, etc.) are known in the art. Components of the prior art power generation systems may be mobile (i.e., configured to be transportable), or these prior art power generation systems may be immobile (i.e., configured to be stationary). The immobile power generation systems may comprise larger and heavier equipment relative to the mobile systems. Such may, in general, allow the immobile power generation systems to generate a larger amount of electric power as compared to the mobile systems. However, the immobile power generation systems cannot be relocated easily, and thus, it is not cost effective to move them to a work site or from one work site to another. In addition, immobile power generation systems require significant effort to install, such as by having to install concrete, piping, cables, et cetera.

To remedy these issues, mobile power generation systems can be used instead (e.g., for an oil and gas and/or industrial power generation application). Mobile power generation systems are transportable, can be configured for quick installation (relative to immobile power generation systems), generally do not require significant installation efforts, and require minimal installation resources. Typically, the mobile power generation systems include one or more trailers that house the power generation equipment, and these trailers are set up at the work site that requires power. Once the job is completed at that particular work site, the trailers are packed up and moved to another work site where power is required. In this way, the inflexibility of prior art power generation systems that are immobile is overcome. However, the prior art mobile power generation systems come with their own set of issues. For one, the amount of weight that the mobile power generation systems can carry is limited by the size of the trailers used, the trailer frame and/or suspension, and the towing capability of the vehicles used to move the trailers. In some instances, more than one trailer may have to be used to output an amount of electric power equaling that of a typical immobile power generation system. Another issue of the mobile power generation systems is that they become more complex to assemble as the number of trailers increases, and they may require a larger amount of space than is available at the worksite.

Each trailer of a multi-trailer power generation system may need to be aligned with its counterparts for operation, which presents its own issues. This assembly requirement also limits the size, number, and/or configuration of the trailers. For instance, locating an electric power generator on a first trailer and a gas turbine to drive the generator on a second trailer presents alignment issues that need to be addressed to allow the equipment to function together as desired. Further, increasing the number of trailers used may increase the complexity and the assembly time of the system, require an increased area to operate the system, and/or require a larger number of vehicles to transport the system. Thus, while having a plurality of trailers in such systems may provide flexibility, it also introduces significant challenges. In view of these competing considerations, the prior art mobile generation systems typically limit the number of trailers to two trailers. Embodiments of the mobile electric power generation system described herein may employ four trailers but may do so in such a way so as to eliminate or at least minimize the problems associated with using such a large number of trailers in a mobile power generation system.

An embodiment 100 of a mobile electric power generation trailer system is shown in FIG. 1. The mobile electric power generation trailer system 100 (sometimes referred to herein as a "mobile power system") may include a generator trailer 110, a gas turbine trailer 120, an exhaust trailer 130, and an air filter and ventilation trailer 140. Each of the trailers 110, 120, 130, and 140 may be completely independent and may be separately transportable in a transport mode. The trailers 110, 120, 130, and 140 may be brought together and easily assembled in an operational mode to generate power (e.g., generate electrical power for equipment at a work site). The mobile power system 100 may be selectively attached to one or more vehicles 50 (e.g., a truck) (FIG. 10A) for transport. For instance, the trailers 110, 120, 130, and 140 may each have their own vehicle 50 to enable relocation from one work site to the next. Alternatively, a single vehicle 50 may transport the trailers 110, 120, 130, and 140 (e.g., transport one trailer, then transport another trailer, and so on).

Figure 2A:
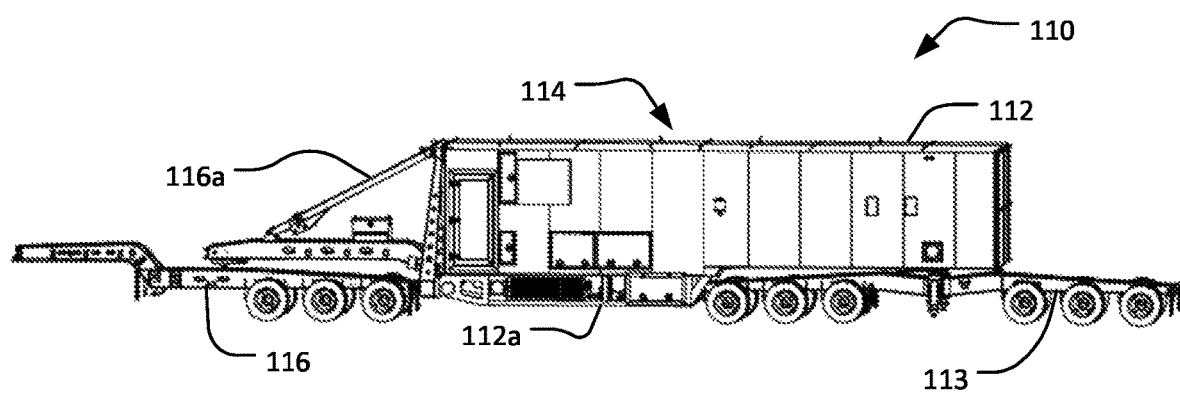
FIG. 2A is a left side view of a generator trailer of the mobile electric power generation trailer system of FIG. 1.
Figure 2B:
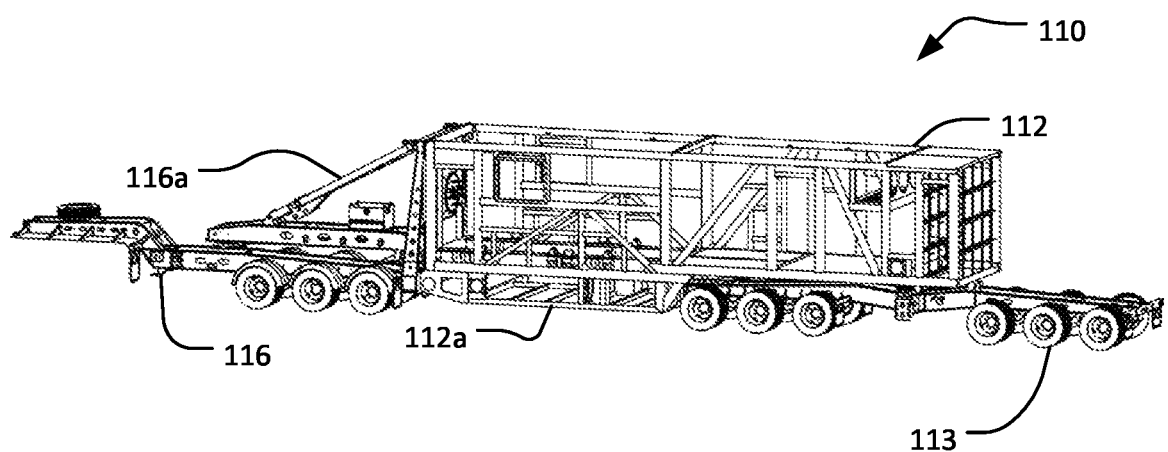
FIG. 2B is an isometric view of a monocoque frame of the generator trailer of the mobile electric power generation trailer system of FIG. 1.

FIG. 2A shows the generator trailer 110 in more detail, and FIG. 2B shows the generator trailer 110 without its internal components. The generator trailer 110 may have a generator trailer docking plate 111 (FIGS. 4A and 4B), a dolly 113, and a generator 114, each mounted to a single generator trailer frame 112. In embodiments, the generator trailer 110 may include a separable or detachable jeep 116 with a detachable gooseneck 116a (e.g., a Schnabel gooseneck). The generator 114 may be any suitable number or type of electric power generators now known or subsequently developed. The generator 114 may be configured to be driven by the gas turbine 124 (FIG. 1) of the gas turbine trailer 120 to produce electricity in the operational mode. The generator 114 may benefit from being housed on a separate trailer from the gas turbine 124 due to the physical limits imposed on the size and weight of trailers. That is to say, trailers can only be so big or carry so much weight before those qualities begin to have a detrimental effect on the operation of said trailers. Making the trailers too large may result in trailers that are unable to fit and/or effectively maneuver on roads and/or the work site. Making the trailers too heavy may detrimentally increase the likelihood of structural failure. By separating the generator 114 from the gas turbine 124, the generator 114 used may have a larger power producing capacity relative to a trailer system which must sacrifice capacity to accommodate both a generator and a gas turbine on the same trailer.

The generator trailer frame 112 may be a monocoque truss frame of any suitable size to fit the components of the generator trailer 110. The frame 112 may be configured to fit any desirable support equipment (not shown), such as by including an underbelly 112a for housing the support equipment. The frame 112 may have wheels or other motive components (e.g., treads) to allow the generator trailer 110 to be moved. The frame 112 may also be selectively attachable to the jeep 116 and Schnabel gooseneck 116a, that in turn may be coupled to a vehicle 50 for transport during the transport mode. Once the generator trailer 110 has arrived at the work site, the jeep 116 and the Schnabel gooseneck 116a may be detached from the generator trailer frame 112 to allow the generator trailer 110 to be assembled with the other trailers in the operational mode. The jeep 116 and the Schnabel gooseneck 116a, by virtue of their detachability, may allow the generator trailer 110 to be transportable while having a reduced footprint at the work site once in the operational mode.

Because the generator trailer frame 112 may be required to support significant weight, the generator trailer 110 may include additional components such as the dolly 113. The dolly 113 may be an additional set of wheels (e.g., a 6-axle set of wheels) that may reduce the overall load per axle that the generator trailer 110 experiences and increase the overall stability of the generator trailer 110. By distributing the weight of the generator trailer 110 over a larger number of axles, the generator trailer 110 may safely support heavier weights relative to a trailer that utilizes fewer axles. To further aid in the stability of the generator trailer 110 when in the transport mode, the jeep 116 may have the gooseneck 116a (e.g., a Schnabel gooseneck). This gooseneck 116a may selectively attach to the generator monocoque frame 112 and provide stability thereto, which may increase the transportability of the generator trailer 110 over various terrain. Once in place at the work site, the Schnabel gooseneck 116a may be detached from the generator trailer 110 along with the jeep 116, and as such, the Schnabel gooseneck 116a and the jeep 116 may have no impact on the footprint of the generator trailer 110 in the operational mode.

Figure 3A:
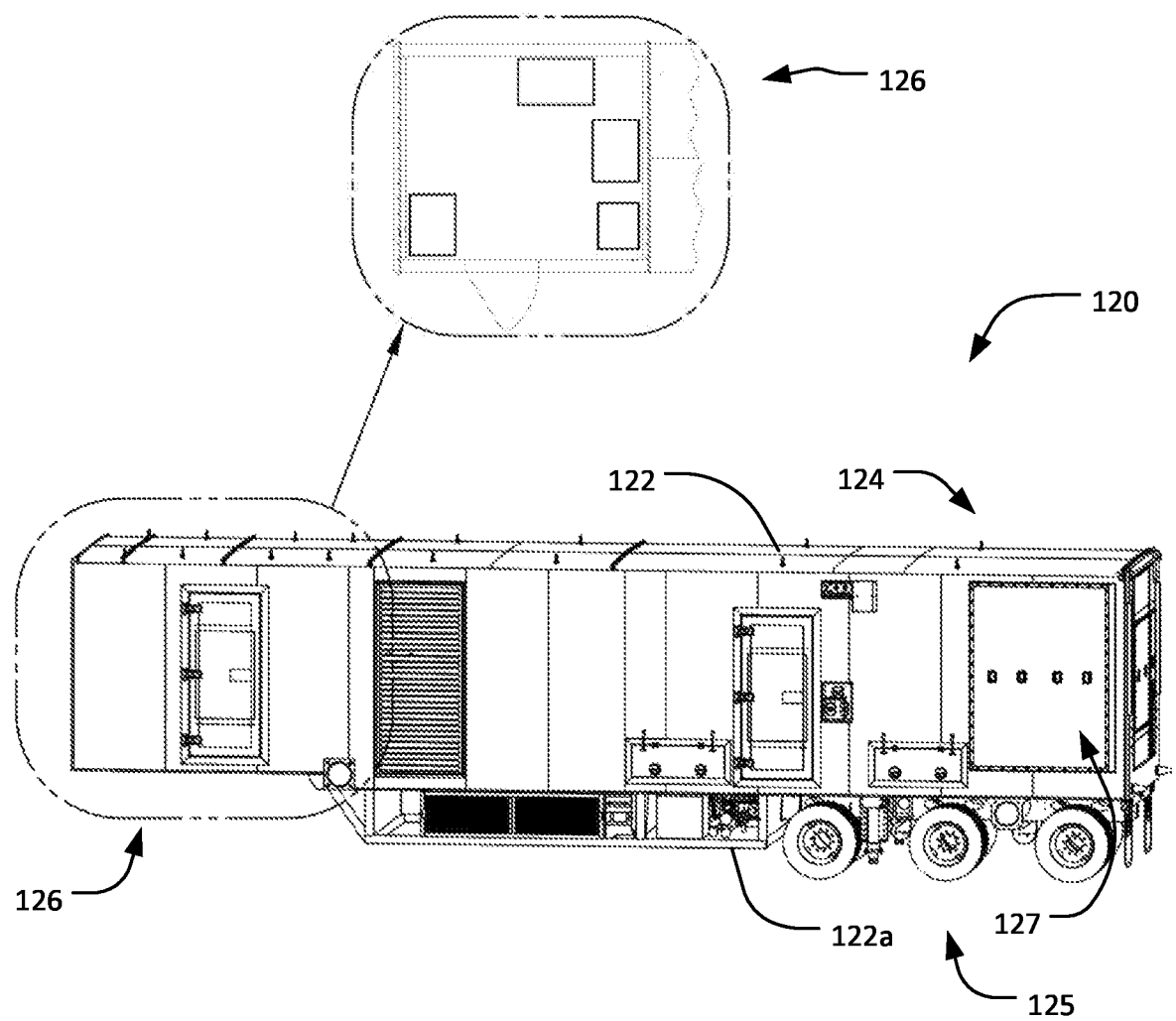
FIG. 3A is an isometric view of a left side of a gas turbine trailer of the mobile electric power generation trailer system of FIG. 1.
Figure 3B:
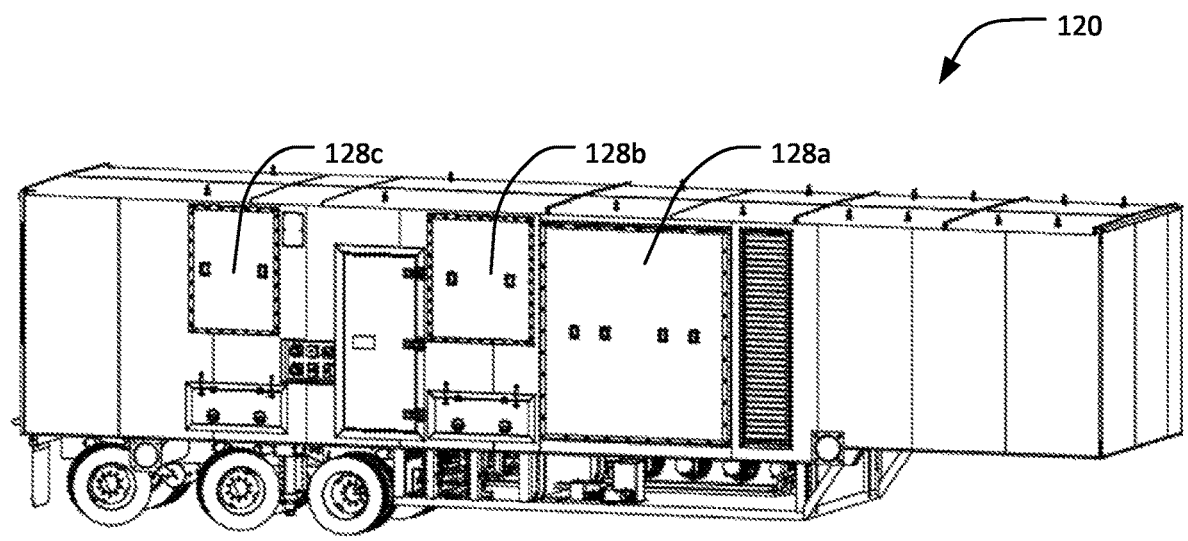
FIG. 3B is an isometric view of a right side of the gas turbine trailer of the mobile electric power generation trailer system of FIG. 1.
Figure 4A:
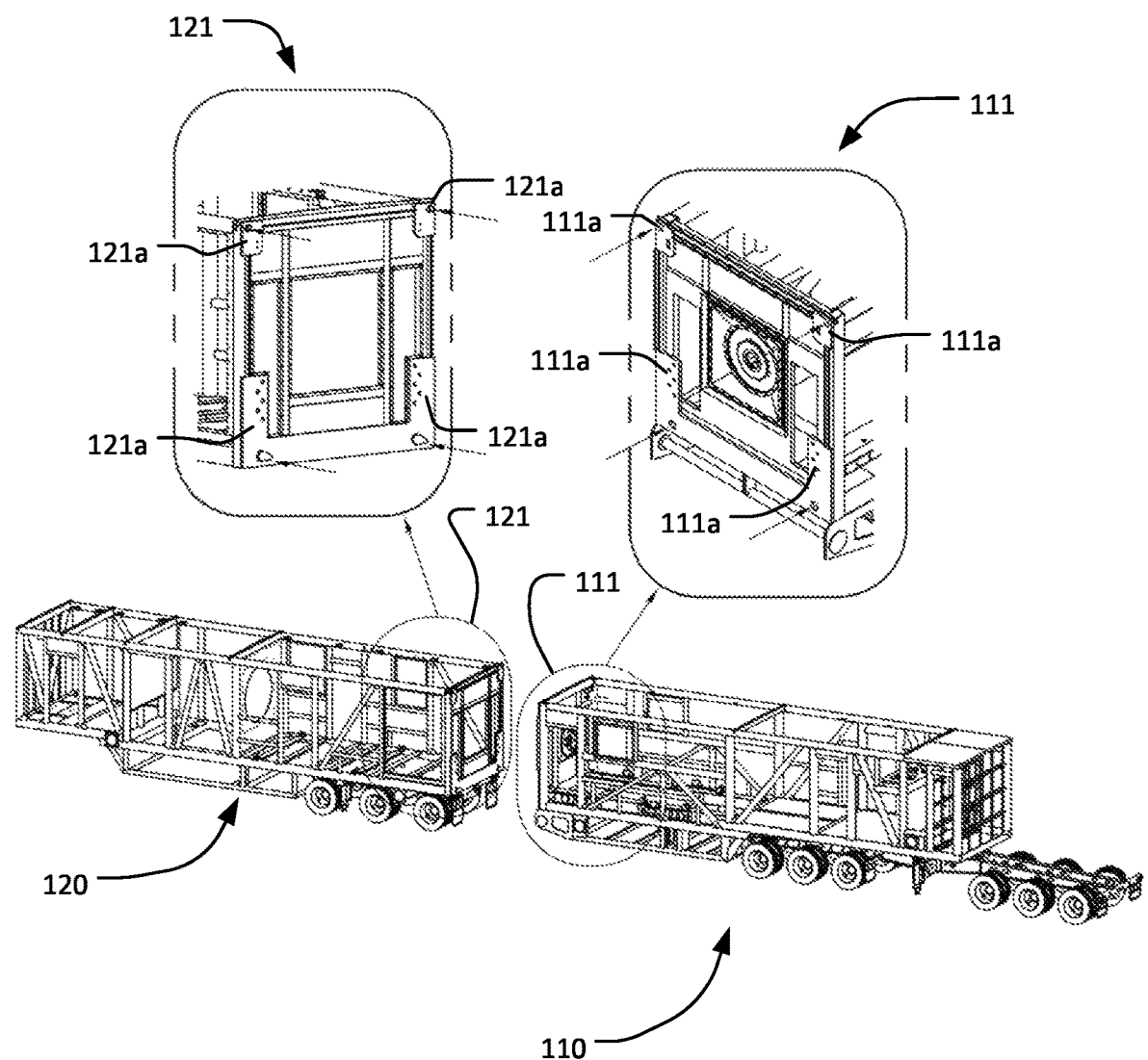
FIG. 4A is an isometric view of the gas turbine trailer and the generator trailer of the mobile electric power generation trailer system of FIG. 1, in an undocked state.
Figure 4B:
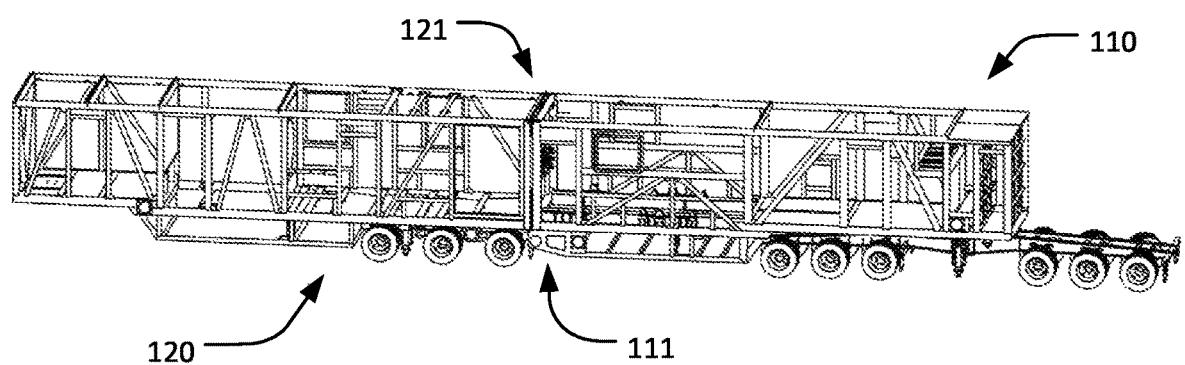
FIG. 4B is an isometric view of the gas turbine trailer and the generator trailer of the mobile electric power generation trailer system of FIG. 1, in a docked state.

Focusing now on FIGS. 3A and 3B, the gas turbine trailer 120 may have a monocoque truss frame 122 (similar in operation to the frame 112) which mounts the gas turbine 124, a control room 126, air exhaust ports 127, air inlet ports 128, and a gas turbine docking plate 121 (FIGS. 4A and 4B). In embodiments, similar to the generator trailer 110, the gas turbine trailer 120 may include an underbelly 122a for housing support equipment. Like the generator trailer 110, the gas turbine trailer 120 may be a trailer that is movable in the transport mode (e.g., via a vehicle 50) and may be assembled with the other trailers 110, 130, and 140 at the work site in the operational mode. The gas turbine 124 may be any suitable gas turbine now known or subsequently developed, and the gas turbine 124 may be configured to drive the generator 114. The gas turbine 124 operates by burning fuel (e.g., natural gas) to produce mechanical energy (e.g., by turning a shaft), and this mechanical energy may be used to drive the generator 114, which in turn produces electricity for the work site.

The control room 126 of the gas turbine trailer 120 may include any suitable control components now known or subsequently developed, as desired. For instance, in embodiments, the control room 126 may include an auxiliary battery, a motor control center, a lighting and distribution transformer, and a user control panel. In operation, the control room 126 may be used by a user to monitor, adjust (e.g., increase/decrease power output), and/or actuate the mobile power system 100 in the operational mode. The control room 126 may be configured to communicate (e.g., via a wired and/or a wireless connection) with the trailers 110, 120, 130, 140 of the system 100, and may send and receive data (e.g., commands, sensor readings, etc.) therebetween.

The gas turbine trailer 120 may have one or more air flow ports that correspond to each of the exhaust trailer 130 and the air filter and ventilation trailer 140 when in the operational mode. For instance, the gas turbine trailer 120 may have an exhaust port 127 for moving air between the gas turbine trailer 120 and the exhaust trailer 130, and inlet ports 128a, 128b, and 128c for moving air between the gas turbine trailer 120 and the air inlet and ventilation trailer 140. In embodiments, in the operational mode, the exhaust port 127 and the inlet ports 128a, 128b, 128c may be on opposing sides of the gas turbine trailer 120. For example, the exhaust port 127 may be located on the left (or right) side of the gas turbine trailer 120, and the inlet ports 128a, 128b, 128c may be located on the right (or left) side of the gas turbine trailer 120. Having air flow port 127 and air flow ports 128a, 128b, 128c on opposing sides of the gas turbine trailer 120 may enable the exhaust trailer 130 and the air filter and ventilation trailer 140 (e.g., the port 128a may correspond to the combustion air silencer 143 (FIG. 6A), the port 128b may correspond to the ventilation air supply 144 (FIG. 6A), the port 128c may correspond to the ventilation air discharge 145) (FIG. 6A) to couple to opposing sides of the gas turbine trailer 120 in the operational mode (see FIG. 1). Such may desirably negate the need to cram the exhaust trailer 130 and the air filter and ventilation trailer 140 together on the same side of the gas turbine trailer 120 in the operational mode.

In embodiments, the gas turbine trailer 120 may have a steerable set of wheels 125 proximate the rear of the trailer 120 (e.g., opposite of where a vehicle 50 may tow the trailer 120). In use, the steerable set of wheels 125 may facilitate aligning of the gas turbine trailer 120 with the generator trailer 110 when assembling the trailers 110, 120 together in the operational mode. The steerable set of wheels 125 may be steerable, for example, from a pendant.

The generator trailer docking plate 111 and the gas turbine trailer docking plate 121 are shown in FIG. 4A (where the trailers 110 and 120 are separated) and FIG. 4B (where the trailers 110 and 120 are assembled together). The generator trailer docking plate 111 and the gas turbine docking plate 121 may have mating features 111a and 121a, respectively. The mating features 111a, 121a may be corresponding (e.g., male and female) components that may facilitate mating alignment of the generator trailer 110 and the gas turbine trailer 120 when assembling the trailers 110 and 120 in the operational mode. For example, the mating features 111a in the generator trailer docking plate 111 may be apertures and the mating features 121a in the gas turbine trailer docking plate 121 may include protrusions, and the apertures 111a may be sized to receive the protrusions 121a to couple the two trailers. In embodiments, the docking plates 111, 121 may be configured to receive other securing mechanisms, such as clamps, bolts, screws, et cetera. In use, the docking plates 111, 121 and the mating features 111a, 121a may facilitate the alignment of the generator trailer 110 and the gas turbine trailer 120 during assembly and operation of the system 100 and ensure the stability of the trailers 110, 120 after they are coupled.

Figure 5A:
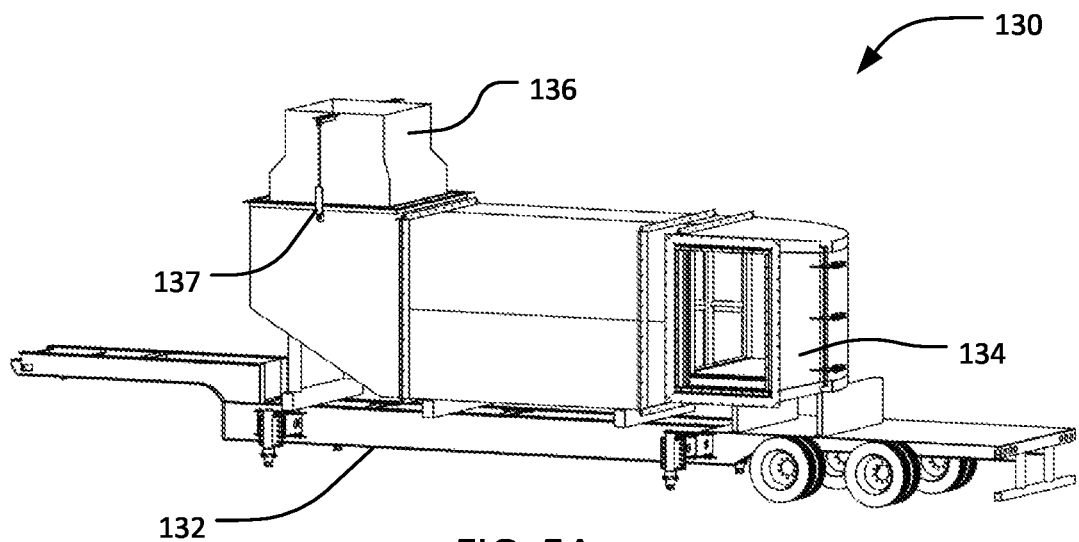
FIG. 5A is an isometric view of an exhaust trailer of the mobile electric power generation trailer system of FIG. 1, in an operational mode.
Figure 5B:
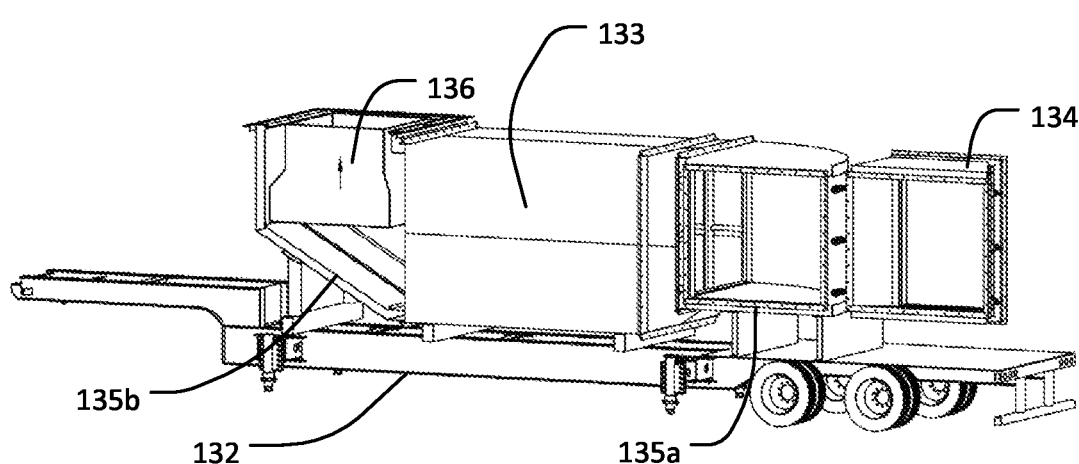
FIG. 5B is an isometric view of the exhaust trailer of the mobile electric power generation trailer system of FIG. 1, in a transport mode.

Attention is now drawn to FIGS. 5A and 5B, which show the exhaust trailer 130 in the operational mode (FIG. 5A) and the transport mode (FIG. 5B). The exhaust trailer 130 may include a trailer frame 132 and exhaust silencer 133 which mounts a hinged (e.g., horizontally hinged) exhaust inlet 134 and a retractable exhaust outlet 136. In use, the exhaust trailer 130 may be towed (e.g., by a vehicle 50) to a work site and assembled with the gas turbine trailer 120, where the exhaust trailer 130 may receive and regulate exhaust air from the gas turbine trailer 120. The exhaust trailer 130 may, in embodiments, serve to keep the noise from the gas turbine trailer 120 within regulatory (e.g., environmental) standards.

The hinged exhaust inlet 134 may be configured to couple to the gas turbine trailer 120 (e.g., to the exhaust air port 127 thereof) and may receive therefrom the gas turbine 124 exhaust air. The hinged exhaust inlet 134 may be selectively switchable between two positions. The first position may be a position where the hinged exhaust inlet 134 is coupled to an exhaust air plenum 135a of the exhaust trailer 130 such that the gas turbine 124 exhaust air may be directed through the hinged exhaust inlet 134 and into the plenum 135a. Typically, the hinged exhaust inlet 134 may be put into the first position when the system 100 is being assembled into the operational mode. The second, or storage, position may be a position where the hinged exhaust inlet 134 is not operably coupled to the plenum 135a, such that hinged exhaust inlet 134 no longer directs air into the plenum 135a. In the second position, which is typically used for the transport mode of the system 100, the hinged exhaust inlet 134 may be arranged in a manner that facilitates transport of the exhaust trailer 130. For example, in an embodiment and as shown in FIG. 5B, the hinged exhaust inlet 134 may be moved in a horizontal plane from the first position to lie generally parallel to the exhaust trailer frame 132, behind the plenum 135a. In other embodiments, the hinged exhaust inlet 134 may be moved in other directions (e.g., vertically, axially, etc.) to be put into the second position. In this way, the hinged exhaust inlet 134 may be secured in a storage position and precluded from unduly interfering in the transport of the exhaust trailer 130.

The retractable exhaust outlet 136 may receive exhaust air from a plenum 135b (which may itself be operably coupled to air plenum 135a) and release the exhaust air into the ambient (e.g., environmental) air. The retractable exhaust outlet 136 may be selectively movable between a first position and a second position. The first position, which is typically used when the system 100 is in the operational mode, may be where the retractable exhaust outlet 136 is extended such that the retractable exhaust outlet 136 may facilitate the transition of the exhaust air from the plenum 135b to the outside ambient air. The second position, which is typically used when the system 100 is in the transport mode, may be where the retractable exhaust outlet is retracted within the exhaust trailer 130 (e.g., the plenum 135b) and/or a footprint thereof. In this second position, the retractable exhaust outlet may be precluded from unduly interfering with the transport of the exhaust trailer 130.

To facilitate the transition between the first and second positions described above, one or more of the hinged exhaust inlet 134 and the retractable exhaust outlet 136 may include an actuator 137. The actuators 137 may include, for example, one or more hydraulic (or pneumatic, motorized, etc.) devices that facilitate the transition of the components 134 and/or 136 between their two positions. In embodiments, the hinged exhaust inlet 134 and/or the retractable exhaust outlet 136 may alternatively or additionally be configured to be transitioned between the two positions by hand.

Figure 6A:
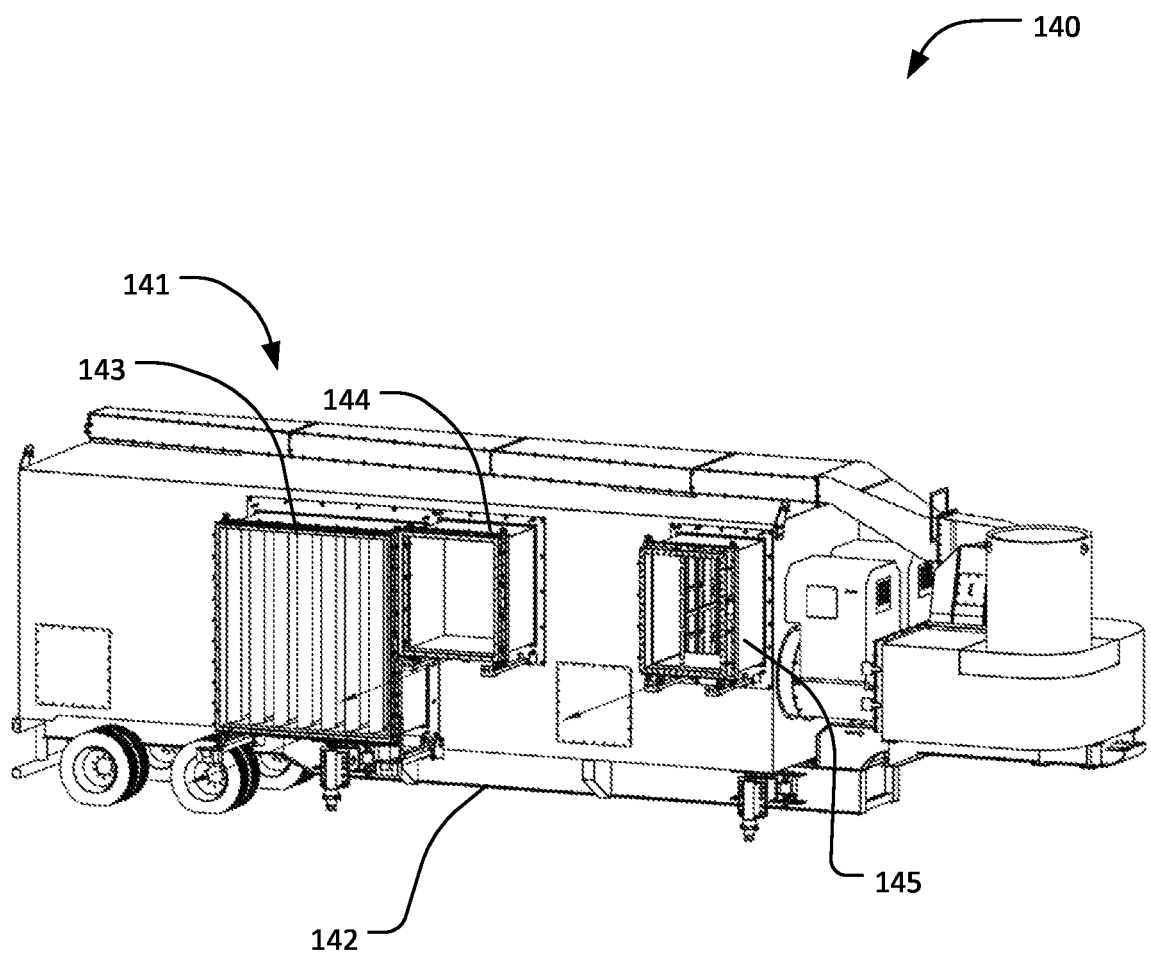
FIG. 6A is an isometric view of the air filter and ventilation trailer of the mobile electric power generation trailer system of FIG. 1.
Figure 6B:
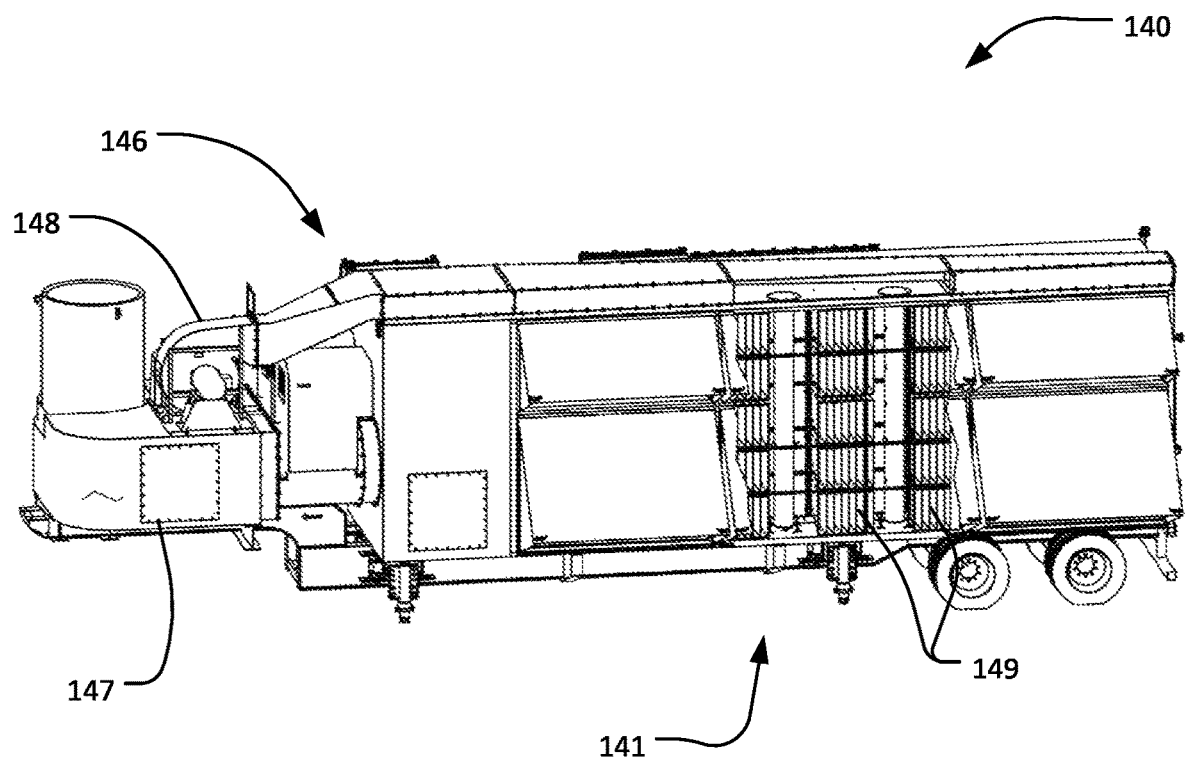
FIG. 6B is another isometric view of the air filter and ventilation trailer of the mobile electric power generation trailer system of FIG. 1.

Focus is now directed to FIGS. 6A and 6B, which illustrate the air filter and ventilation trailer 140. The air filter and ventilation trailer 140 may include a trailer frame 142 which mounts an air intake filter 141, a combustion air silencer 143, a ventilation air supply 144, a ventilation air discharge 145, and an anti-icing system 146. In use, the air filter and ventilation trailer 140 may provide both combustion air to the gas turbine 124 and ventilation air to the gas turbine trailer 120. The air filter and ventilation trailer 140 may be selectively switchable between the operational mode, where the trailer 140 is assembled with the gas turbine trailer 120 and provides air thereto, and a transport mode, where the trailer 140 is configured to be movable (e.g., by a vehicle 50).

The air intake 141 may be any suitable device now know or subsequently developed that is configured to intake ambient, or other, air. This ambient air may then be routed through the combustion air silencer 143 to the gas turbine 124 where the ambient air may be used to facilitate the combustion of the fuel therein. In some embodiments, the combustion air intake 141 may also filter the ambient air such that the ambient air is made more suitable to be used by the gas turbine 124. In addition, the combustion air silencer 143 may serve to keep the noise from the gas turbine 124 within regulatory standards.

Like the combustion air silencer 143, the ventilation air supply 144 may make use of ambient air provided by the air intake filter 141. However, the ventilation air supply 144 may instead route the ambient air into the gas turbine trailer 120 itself. With the aid of the ventilation air discharge 145 (which itself may direct air out from the inside of the gas turbine trailer 120), the air within the gas turbine trailer 120 may be circulated, such as for the purposes of temperature control, ensuring safe breathing air, et cetera. The air removed from the gas turbine trailer 120 may, in embodiments, be vented to atmosphere.

The anti-icing system 146, as seen in FIG. 6B, may include a ventilation discharge plenum 147, a blower 148, and one or more warming devices 149. The ventilation discharge plenum 147 may collect some or all of the air directed by the ventilation air discharge 145, and route the collected air to the blower 148. The blower 148 may be any suitable blower fan now known or subsequently developed, and may redirect the air collected in the ventilation discharge plenum 147 through the warming devices 149. The warming devices 149 may be adjacent the air intake 141, and may transport the redirected air across (e.g., vertically, horizontally, diagonally, in a pattern, etc.) the air intake 141. In some embodiments, the warming devices 149 may be configured (e.g., via apertures) to inject the redirected air in and/or on the air intake 141 itself. In operation, the anti-icing system 146 may collect the ventilation air warmed inside the gas turbine trailer 120 and direct the warmed ventilation air to the air intake 141 to provide a warming effect thereto. This warming of the air intake 141 may offset some or all of the detrimental effect of below optimal ambient temperatures the air intake 141 may be experiencing, such as by melting ice that may have formed on the air intake 141 during cold temperature operation. In embodiments, the warmed air provided by the anti-icing system 146 may alternatively or additionally serve to warm the ambient air being taken in by the air intake 141, which may augment the capabilities (e.g., the efficiency and/or the total power output) of the gas turbine 124. The artisan would understand that the anti-icing system 146 itself and/or the operation thereof may be optional in embodiments configured for use in warmer climates, where cold ambient air may not be as much of a concern.

In the operational mode, each of the combustion air silencer 143, the ventilation air supply 144, and the ventilation air discharge 145 may be coupled to the corresponding air intake ports 128a, 128b, 128c provided on the gas turbine trailer 120. For instance, in the operational mode, the combustion air silencer 143 may be operably coupled to the port 128a, the ventilation air supply 144 may be operably coupled to the port 128b, and the ventilation air discharge 145 may be operably coupled to the port 128c. In the transport mode, each of the combustion air silencer 143, the ventilation air supply 144, and the ventilation air discharge 145 may be retracted within the air filter and ventilation trailer 140 and/or a footprint thereof to preclude the components 143, 144, or 145 from unduly interfering with the transport of the trailer 140. In embodiments, one or more actuators (as described above with respect to actuators 137) may be used to facilitate the movement of the components 143, 144, and 145.

Figures 7A, 7B:
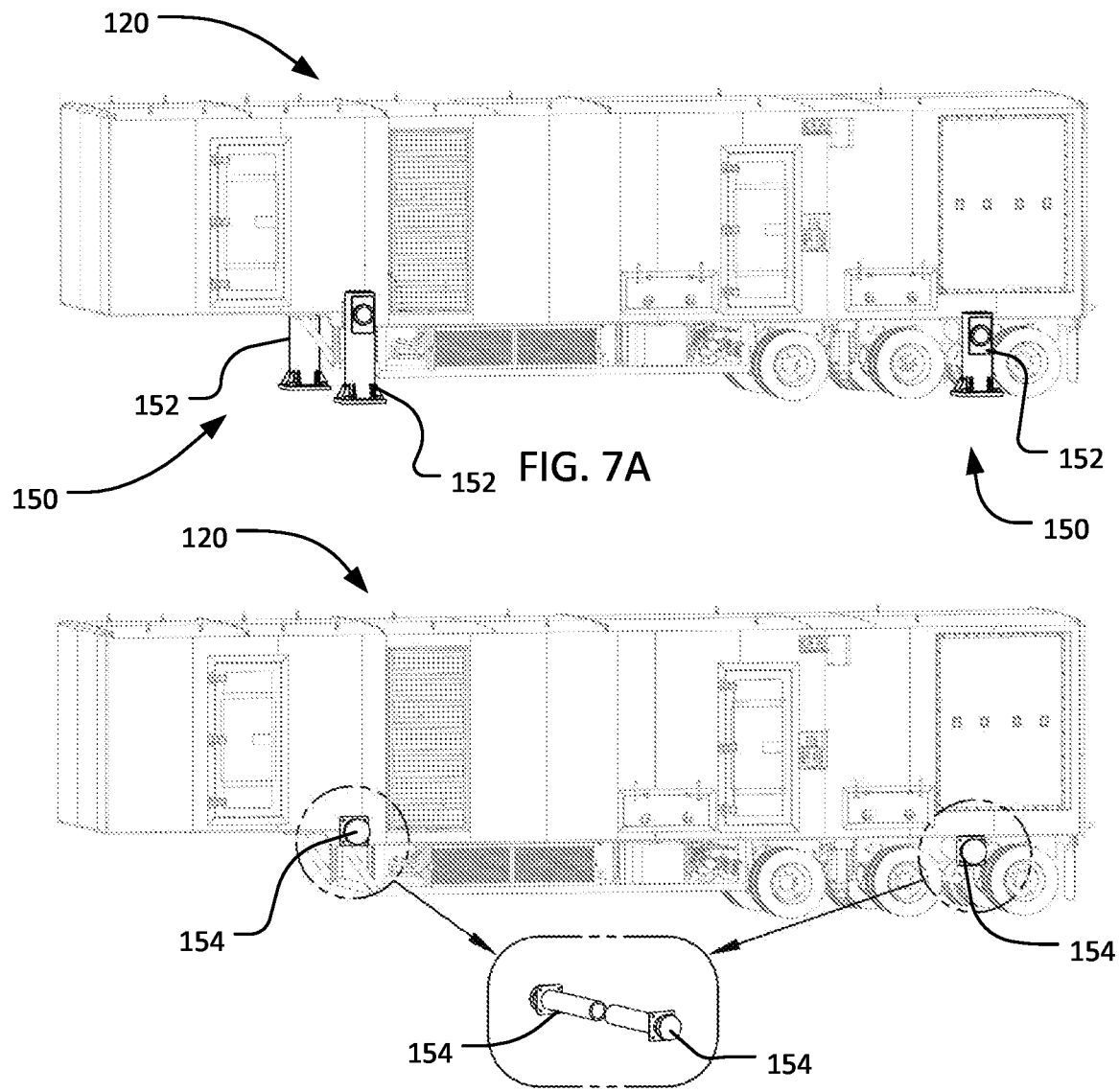
FIG. 7A is an isometric view of a stabilizer system of the mobile electric power generation trailer system of FIG. 1, in the operational mode.
FIG. 7B is an isometric view of a lift system of the mobile electric power generation trailer system of FIG. 1, in the transport mode.

Attention is now directed to FIGS. 7A and 7B, where a stabilization (or "lift") system 150 for stabilizing one or more of the trailers 110, 120, 130 and/or 140 in the operational mode is shown. While the stabilization system 150 is shown here in use with the trailer 120, the artisan would understand that the stabilization system 150 may be used with any or all of the trailers of the mobile power system 100. The stabilization system 150 may include one or more restraints 152. The restraints 152 may preclude the trailer from undesirably tipping or moving, such as during high wind conditions or seismic activity. For example, the restraints 152 themselves may provide additional stability to their respective trailer, and/or may be configured to be secured to a surface (e.g., a concrete pad) to provide extra stability. In some embodiments, the stabilizer system 150 may alternatively or additionally provide damping to the trailers, such that harmful forces (e.g., large vibrational forces) acting thereupon are mitigated or otherwise attenuated. When transitioning to the transport mode, the restraints 152 may be decoupled from the trailers.

Referring to FIG. 7B, the same structure that is included on trailer 120 to connect the restraints 152 may be used to alternatively or additionally connect lift bars 154. The lift bars 154 may be used to lift the trailer (e.g., the entire trailer). Similar to the restraints 152, the lift bars 154 may be decoupled from the trailers 110, 120, 130, and/or 140 when transitioning to the transport mode.

Focus is now directed to FIGS. 8A-8F, where a trailer slide system 160 is shown. Each of the trailers (e.g., trailers 110, 120, 130, 140) of the mobile power system 100 may have a trailer slide system 160, though in embodiments, one or more of the trailers may forego the trailer slide system 160. The trailer slide system 160 may include one or more mounting bars 162, supports 164, and actuators 166. In operation, the trailer slide system 160 may facilitate the repositioning of the trailers of the system 100 when in the operational mode. In other words, the trailer slide system 160 may be able to minutely adjust and/or align the trailers 110, 120, 130, and/or 140 when assembling them into the operational mode. Properly aligning the trailers may be important to ensure that certain components, such as the air ports 127, 128a, 128b, 128c, are able to properly interface with their corresponding trailers (e.g., trailers 130 and 140, respectively).

The adjustments to the position of the trailers made by the trailer slide system 160 may be small (e.g., up to two feet in each direction) relative to the size of the trailers. However, the trailer slide system 160 may facilitate repositioning of the trailers when in the operational mode, where the trailers may otherwise be unable to move (e.g., because they are decoupled from their vehicles 50). With prior art mobile power generation systems, coupling, decoupling, and repositioning with vehicles to ensure the prior art trailers properly attach to each other is often a time-consuming task, particularly because operational space in the work site is limited. Thus, even a small misalignment or misplacement of the prior art trailers upon initial placement may result in costly delays spent on repositioning the prior art trailers, and equipment failure may occur if misaligned equipment is used. Therefore, there is a need for a way to reposition trailers of a mobile power system quickly and efficiently. The trailer slide system 160 and its embodiments disclosed herein may provide for such.

Figure 8A:
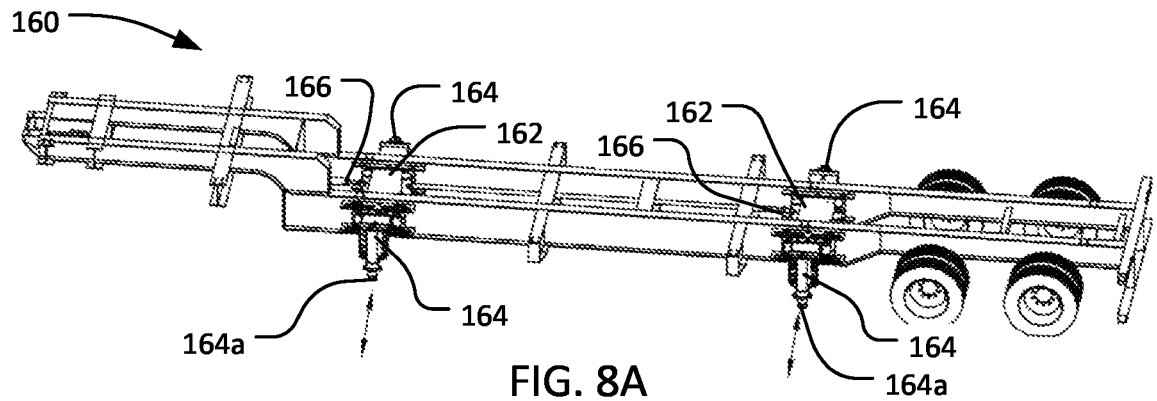
FIG. 8A is an isometric view of a trailer slide system of the mobile electric power generation trailer system of FIG. 1.
Figure 8B:
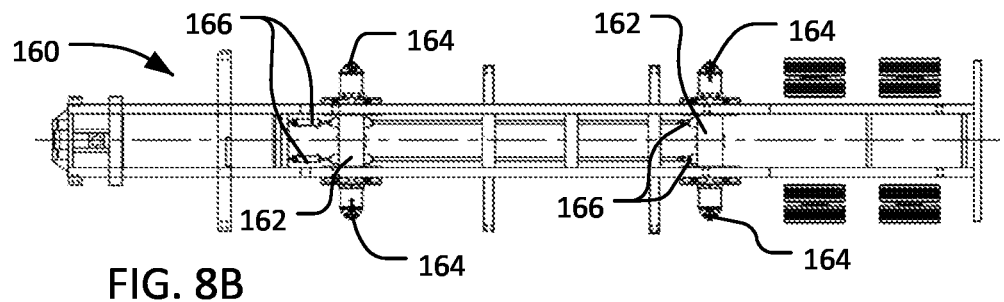
FIG. 8B is a top view of the trailer slide system of the mobile electric power generation trailer system of FIG. 1, in a first position.
Figure 8C:
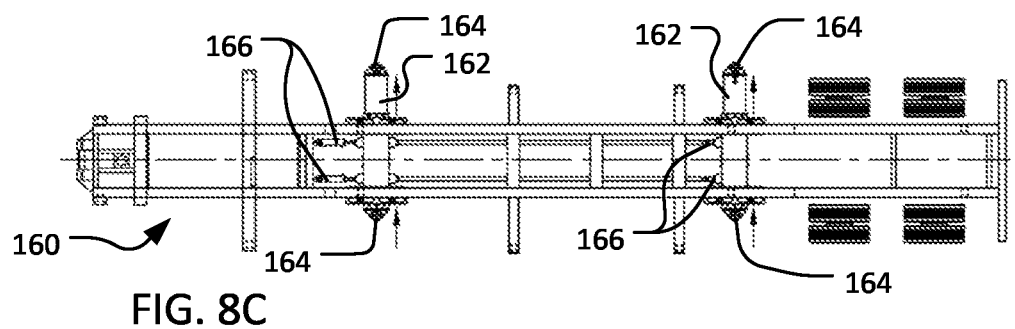
FIG. 8C is a top view of the trailer slide system of the mobile electric power generation trailer system of FIG. 1, in a second position.
Figure 8D:
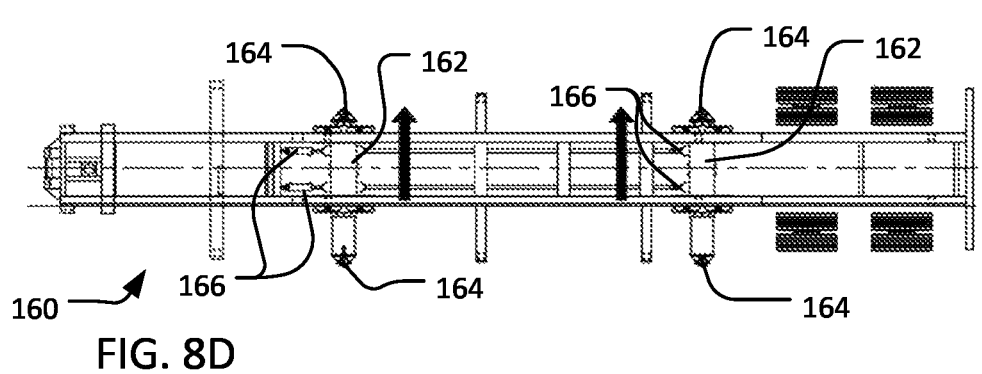
FIG. 8D is a top view of the trailer slide system of the mobile electric power generation trailer system of FIG. 1, in a third position.
Figure 8E:
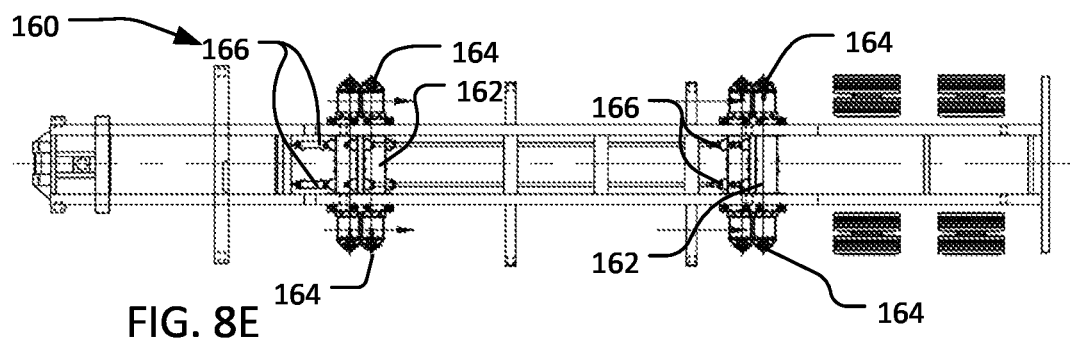
FIG. 8E is a top view of the trailer slide system of the mobile electric power generation trailer system of FIG. 1, in a fourth position.
Figure 8F:
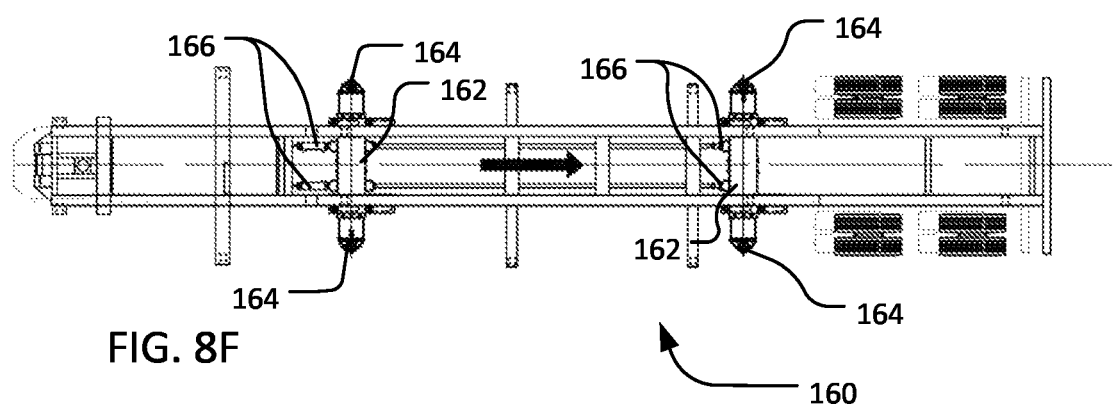
FIG. 8F is a top view of the trailer slide system of the mobile electric power generation trailer system of FIG. 1, in a fifth position.

The one or more mounting bars 162 may be slidably mounted to the frame of a trailer (e.g., trailer 110, 120, 130, and/or 140), and each mounting bar 162 may include a plurality of supports 164 (e.g., located on opposing side of the frame) and a plurality of actuators 166. Each of the plurality of supports 164 may have a foot 164a which is movable (e.g., vertically) to bring the trailer slide system 160 into contact with the ground to give a surface for the trailer slide system 160 to push off. The mounting bars 162 and/or the supports 164 may be operably coupled to actuators 166 (e.g., hydraulic cylinders and/or arms), which may provide motion to the mounting bars 162 and/or the supports 164. In turn, this movement of the mounting bars 162 and the supports 164 may provide overall motion to the trailer frame itself. In embodiments, the actuators 166 may be able to move the supports 164 and the mounting bars 162 in both a lateral direction (FIGS. 8B-8D) and a longitudinal direction (FIGS. 8E-8F).

Example operation of the trailer slide system 160 is described below, with reference to FIGS. 8A-8F. In FIG. 8B, the feet 164a (FIG. 8A) of the supports 164 are lifted off the ground. Then, the mounting bars 162 are slid to the right of the trailer (up on the page) using the actuators 166, as seen in FIG. 8C. Next, in FIG. 8D, the feet 164a are placed on the ground and the mounting bars 162 are slid to the left (down on the page), causing the entire trailer to move to the right (up on the page). Next, in FIG. 8E, the feet 164a are once more lifted from the ground, and the mounting bars 162 are slid to the rear of the trailer (right on the page). Finally, in FIG. 8F, the feet 164a are placed on the ground once more and the mounting bars 162 are slide to front of the trailer (left on the page), causing the entire trailer to move back (to the right of the page). The artisan would understand the above-described operation and the associated figures are merely exemplary and are not meant to be limiting. For example, the trailer slide system 160 may be used to adjust the trailer forward, back, left, and/or right as desired.

Using the trailer slide system 160, the trailers 110, 120, 130, and 140 may quickly and efficiently assemble and/or align in the operational mode. The vehicles 50 may place the trailers 110, 120, 130, and 140 in their approximate location, and then the trailer slide system 160 may be used to correct any errors in position such that the trailers 110, 120, 130, and 140 may be aligned and coupled to each other. The trailer slide system 160 may be controlled, for example, by a control panel (not shown) mounted to the trailer frame that the trailer slide system 160 resides on.

Figure 9:
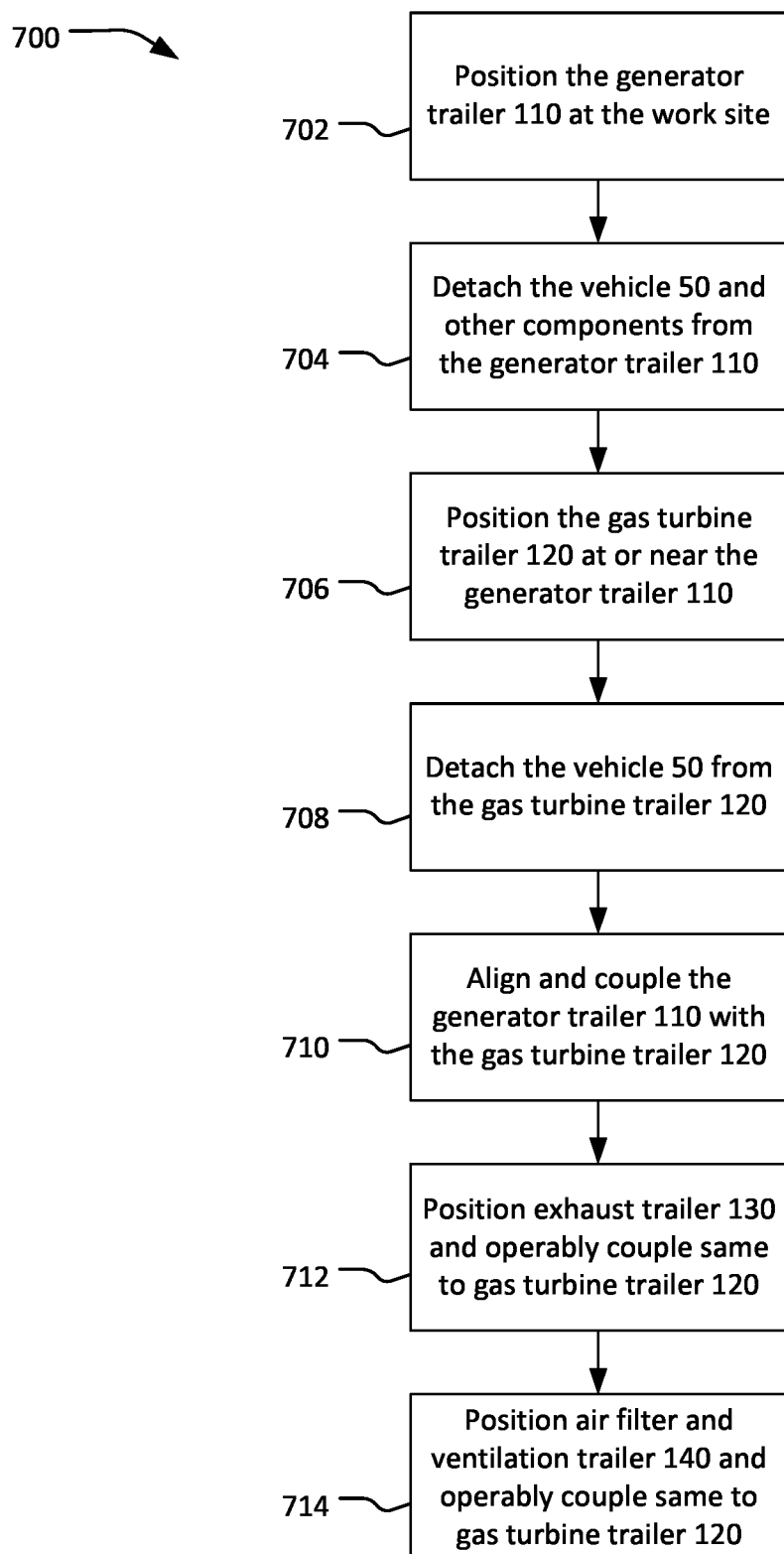
FIG. 9 is a flowchart depicting a method of assembling the mobile electric power generation trailer system of FIG. 1, according to an embodiment.
Figure 10A:
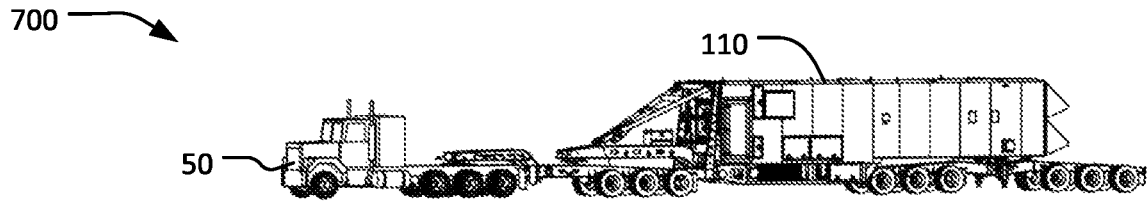
FIGS. 10A-10F are schematic views illustrating the method of assembling the mobile electric power generation trailer system of FIG. 9.
Figure 10B:
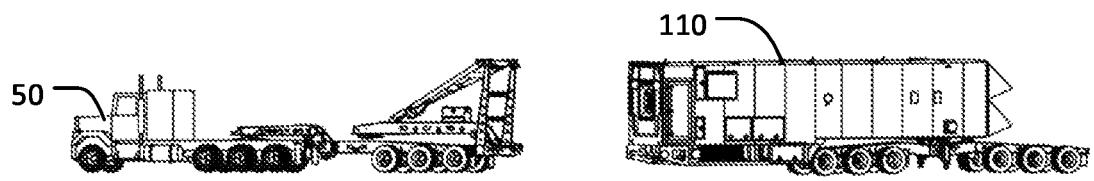
Figure 10C:
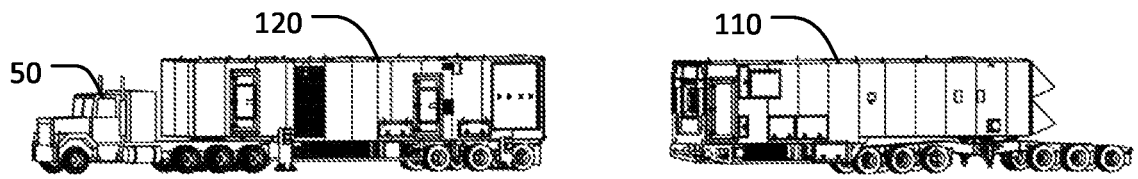
Figure 10D:
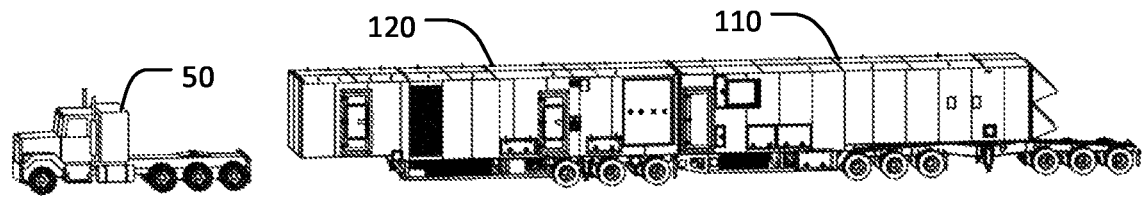
Figure 10E:
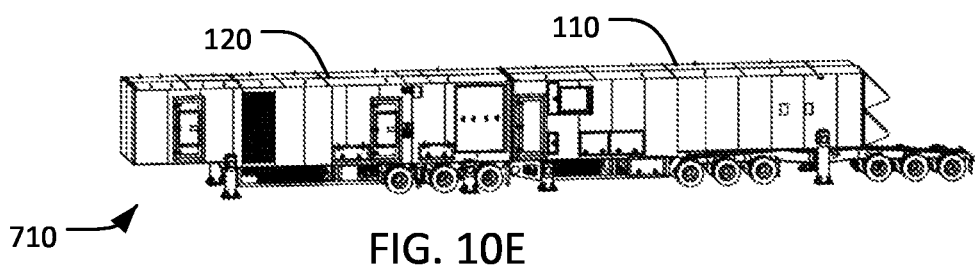
Figure 10F:
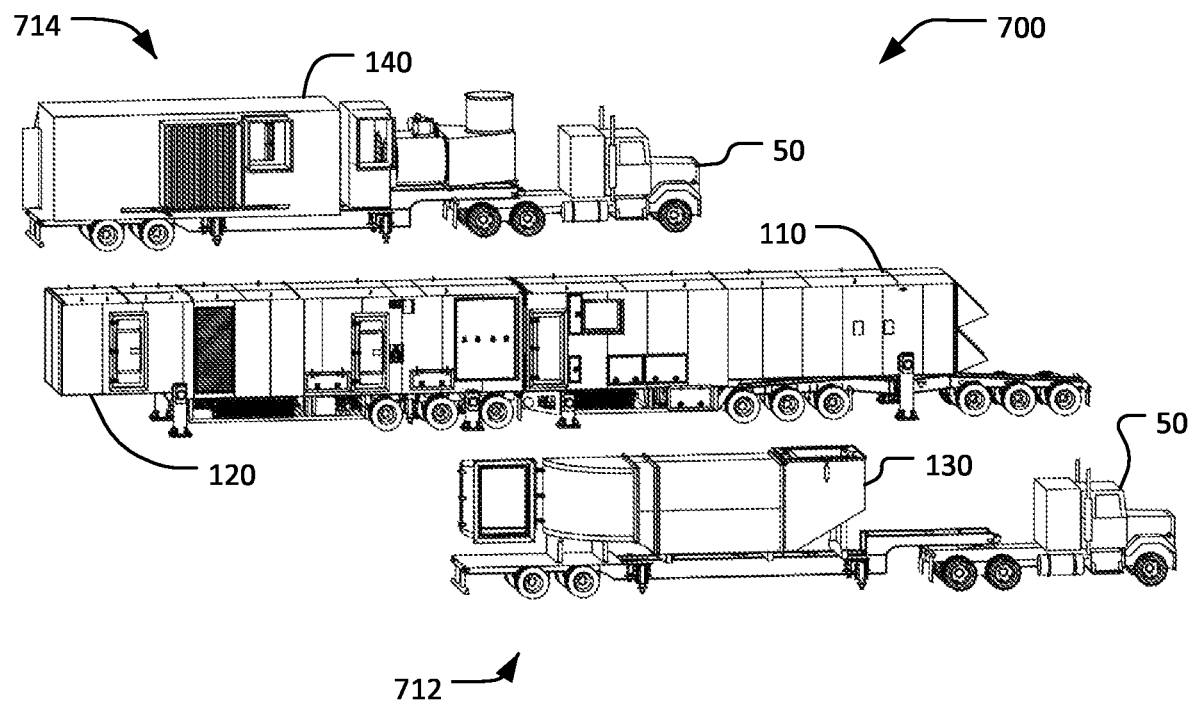

FIG. 9 is a flowchart illustrating a method 700 of operating the various embodiments of the mobile power system disclosed herein. FIGS. 10A-10F pictorially depict the steps of the method 700, in an embodiment (i.e., FIG. 10A depicts step 702, FIG. 10B depicts step 704, FIG. 10C depicts step 706, FIG. 10D depicts step 708, FIG. 10E depicts step 710, and FIG. 10F depicts steps 712 and 714). The method 700 may be used to transition the trailers 110, 120, 130, and 140 from the transport mode to the operational mode, where the system 100 may generate power at a work site. First, at step 702, the system 100 may start in the transport mode where each of the trailers 110, 120, 130, and 140 are separate and independently movable with vehicles 50. The generator trailer 110 is then moved onto (e.g., backed into) the work site. Then, at step 704, the jeep 116 and the Schnabel gooseneck 116a are detached, along with the vehicle 50, leaving behind the generator trailer 110. Next, at step 706, the gas turbine trailer 120 is brought by a vehicle 50 and brought (e.g., backed into) into contact, or close proximity, with the generator trailer 110. Then, at step 708, the vehicle 50 may detach from the gas turbine trailer 120 and leave. At step 710, the generator trailer 110 and the gas turbine trailer 120 may be coupled together. For example, the trailers 110, 120 may utilize their respective trailer slide system 160 to bring the trailers 110, 120 in alignment, and then the docking plates 111, 121 may be mated to complete the coupling. Here, the stabilizers 150 may be set up to provide extra stability to the trailers 110, 120.

The method 700 is continued on FIG. 10F, where at step 712, the exhaust trailer 130 is moved (e.g., pulled forward) onto the work site and detached from its vehicle 50. Here, the trailer slide system 160 of the exhaust trailer 130 may be used to bring the exhaust trailer 130 in alignment with the gas turbine trailer 120. The exhaust trailer 130 may be operably coupled to the exhaust air port 127 of the gas turbine trailer 120. In embodiments, the stabilizer 150 of the exhaust trailer 130 may be set up. Step 714 may essentially repeat the process of step 712, except now using the air filter and ventilation trailer 140, where the trailer 140 is brought on site and operably coupled to the air inlet ports 128a, 128b, 128c of the gas turbine trailer 120. The artisan would understand that the order of the steps 712 and 714 may be interchangeable (i.e., the air filter and ventilation trailer 140 may be coupled to the gas turbine trailer 120 before the exhaust trailer 130).

The steps of the method 700 may be omitted, added to, or modified to implement the various embodiments of the mobile power system described herein. For example, to move the system 100 from the operational mode to the transport mode, the steps of the method 700 may essentially be performed in reverse. As another example, the step of setting up the stabilizing systems 150 may be omitted. As yet another example, the method 700 may be modified to include one or more steps of aligning one or more of the trailers 11, 120, 130, and/or 140 using a trailer slide system.

Because locating the generator and the gas turbine components on separate trailers may increase the difficulty of suitably producing electricity (e.g., due to the added complexity and/or the risk of part misalignment), prior art discourages and teaches away from mobile power generation systems having separate trailers for the generator and the gas turbine. The prior art likewise discourages use of separate trailers for the air inlet and the exhaust. However, with the docking plates 111, 121, the mating features 111a, 121a, and the trailer slide system 160, the system 100 may reap the benefits of employing a plurality of trailers while eliminating or at least minimizing the typical downsides of so doing. For example, the trailer slide system 160 may address some of the difficulties of assembling a plurality of trailers by allowing the trailers of the system 100 to be repositioned after being decoupled from their respective towing vehicles.

While the embodiments described herein typically rely on an external vehicle 50 to tow the trailers 110, 120, 130, and 140, embodiments where the mobile power system 100 uses alternative methods to enable the trailers 110, 120, 130, and 140 to relocate are also contemplated. For example, in embodiments, two or more trailers may be integrated for transport. In a currently preferred embodiment, however, each trailer 110, 120, 130, and 140 is independently transportable and the trailers 110, 120 are not configured to be transported once they are assembled together for operation.

The artisan will understand that the mobile power system 100 disclosed herein may include or have associated therewith electronics (e.g., within the control room 126). The electronics may be used to control and modify the operation of the mobile power system (e.g., control operations of the gas turbine and the generator, monitor operations of the gas turbine and the generator, et cetera). In some example embodiments, the processor or processors may be configured through particularly configured hardware, such as an application specific integrated circuit (ASIC), field-programmable gate array (FPGA), etc., and/or through execution of software to allow the mobile power system 100 to function in accordance with the disclosure herein.

While example applications (e.g., suppling electricity to hydrocarbon extraction sites and/or industrial power generation projects) are used to illustrate the workings of the system 100, the artisan will understand that the mobile power system 100 disclosed herein may be adapted to other mobile applications, and that such adaptions are within the scope of the present disclosure. Examples of other mobile power supply applications may include any application where a supply of electricity is needed, such as a temporary base of operations for a workforce, a large social gathering, et cetera. Examples of non-power related applications where aspects of the disclosure may be employed include, e.g., use of the trailer slide system in other applications where speedy, minute positional adjustment of trailers is beneficial.

Thus, as has been described, the mobile electric power generation trailer system concepts disclosed herein may serve to minimize the effect of using multiple trailers to generate power, and in so doing, provide a mobile power system that is relatively time-efficient and easy to operate. Moreover, the trailers using the trailer slide system concepts disclosed herein may significantly reduce the chance for an equipment misalignment to occur, thus preserving expensive operating equipment, as described above in other embodiments.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations. Not all steps listed in the various figures need be carried out in the specific order described.

The invention claimed is:

1. A method of assembling a mobile electric power generation system, comprising:
using a generator trailer having an electric generator, a gas turbine trailer having a gas turbine, an exhaust trailer configured to exhaust air, and an air filter and ventilation trailer having an anti-icing system, a combustion air silencer, a ventilation air supply, and a ventilation air discharge;
positioning the generator trailer at a work site;
arranging the gas turbine trailer at the work site such that the generator trailer and the gas turbine trailer are in an end-to-end configuration;
operably coupling the gas turbine trailer to the generator trailer;
positioning the exhaust trailer at a first side of the gas turbine trailer;
positioning the air filter and ventilation trailer at a second side of the gas turbine trailer, the second side opposing the first side;
operably coupling each of the exhaust trailer and the air filter and ventilation trailer to the gas turbine trailer; and
coupling each of the combustion air silencer, the ventilation air supply, and the ventilation air discharge respectively to a first port, a second port, and a third port of the gas turbine trailer.

2. The method of claim 1, wherein: (a) positioning the generator trailer at the work site includes backing the generator trailer into the work site using a vehicle; and (b) arranging the gas turbine trailer at the work site includes backing the gas turbine trailer into the work site such that the gas turbine trailer and the generator trailer are in an end-to-end configuration.

3. The method of claim 1, further comprising associating a detachable gooseneck with the generator trailer.

4. The method of claim 3, further comprising detaching the gooseneck from the generator trailer prior to positioning the gas turbine trailer in the end-to-end configuration with the generator trailer.

5. The method of claim 1, further comprising detaching a gooseneck from the generator trailer prior to positioning the gas turbine trailer in the end-to-end configuration with the generator trailer.

6. The method of claim 1, further comprising using a retractable exhaust outlet on the exhaust trailer, the retractable exhaust outlet configured to retract into a plenum for transport.

7. The method of claim 6, further comprising using a hinged exhaust inlet on the exhaust trailer.

8. The method of claim 7, wherein the hinged exhaust inlet is in a first position during a transport mode and in a second position during an operational mode.

9. The method of claim 8, further comprising coupling the hinged exhaust inlet to a fourth port of the gas turbine trailer.

10. The method of claim 1, further comprising configuring the air filter and ventilation trailer to warm intake air by recirculating air from the gas turbine trailer through the anti-icing system.

11. The method of claim 1, wherein the generator trailer includes a dolly.

12. A method of assembling a mobile electric power generation system, comprising:
using a generator trailer having an electric generator, a gas turbine trailer having a gas turbine, an exhaust trailer having an exhaust device, and an air filter and ventilation trailer that includes a combustion air silencer, a ventilation air supply, a ventilation air discharge, and an anti-icing system;
positioning each of the generator trailer, the gas turbine trailer, the exhaust trailer, and the air filter and ventilation trailer at a job site such that the generator trailer and the gas turbine trailer are in an end-to-end configuration and the air filter and ventilation trailer and the exhaust trailer are on opposing sides of the gas turbine trailer;

operably coupling each of the generator trailer, the exhaust trailer, and the air filter and ventilation trailer to the gas turbine trailer in an operational mode for power generation; and decoupling the generator trailer, the air filter and ventilation trailer, and the exhaust trailer from the gas turbine trailer in a transport mode for transport;

wherein, operably coupling the air filter and ventilation trailer to the gas turbine trailer in the operational mode includes coupling each of the combustion air silencer, the ventilation air supply, and the ventilation air discharge respectively to a first port, a second port, and a third port of the gas turbine trailer.

13. The method of claim 12, further comprising aligning the gas turbine trailer and the generator trailer using alignment structures located at an end of each of the generator trailer and the gas turbine trailer.

14. The method of claim 12, wherein each of the generator trailer and the gas turbine trailer further comprise a monocoque truss frame.

15. The method of claim 12, further comprising detaching a detachable gooseneck from the generator trailer prior to operably coupling the gas turbine trailer to the generator trailer.

16. A method of assembling a mobile electric power generation system, comprising:

using a generator trailer having an electric generator, a gas turbine trailer having a gas turbine, an exhaust trailer having an exhaust device, and an air filter and ventilation trailer having a ventilation air supply, a ventilation air exhaust, and a silencer;

generating power with the mobile electric power generation system after each of the ventilation air supply, the ventilation air exhaust, and the silencer are coupled to the gas turbine trailer; and configuring the air filter and ventilation trailer to warm intake air by recirculating air from the gas turbine trailer through an anti-icing system.

17. The method of claim 16, wherein the exhaust trailer includes a hinged exhaust inlet and a retractable exhaust outlet, the retractable exhaust outlet configured to retract into a plenum for transport.

18. The method of claim 16, further comprising detaching a detachable gooseneck from the generator trailer prior to operably coupling the gas turbine trailer to the generator trailer.

\* \* \* \* \*